DIGITAL REGISTER FOR COMMUNICATION SYSTEM

Filed Aug. 9, 1952 4 Sheets-Sheet 1

INVENTORS:
K. KLINKHAMMER - H. STEINBUCH
G. MERK
H. BRETSCHNEIDER
BY
Robert Harding Jr.
ATTORNEY.

DIGITAL REGISTER FOR COMMUNICATION SYSTEM

Filed Aug. 9, 1952 4 Sheets-Sheet 2

INVENTORS:
K. KLINKHAMMER - H. STEINBUCH
G. MERK
BY H. BRETSCHNEIDER
Robert Harding Jr.
ATTORNEY.

INVENTORS:
K. KLINKHAMMER - H. STEINBUCH
G. MERK
BY H. BRETSCHNEIDER
Robert Harding Jr.
ATTORNEY.

INVENTORS:
K. KLINKHAMMER - H. STEINBUCH
G. MERK
BY H. BRETSCHNEIDER
Robert Harding Jr.
ATTORNEY.

2,820,849

DIGITAL REGISTER FOR COMMUNICATION SYSTEM

Kurt Klinkhammer, Stuttgart-Zuffenhausen, Karl Steinbuch, Waiblingen, Gerhard Merk, Stuttgart-Zuffenhausen, and Hans Bretschneider, Stuttgart-Feuerbach, Germany, assignors to International Standard Electric Corporation, New York, N. Y., a corporation of Delaware Application August 9, 1952, Serial No. 303,464

Claims priority, application Germany August 16, 1951

21 Claims. (Cl. 179—18)

Figure 1:
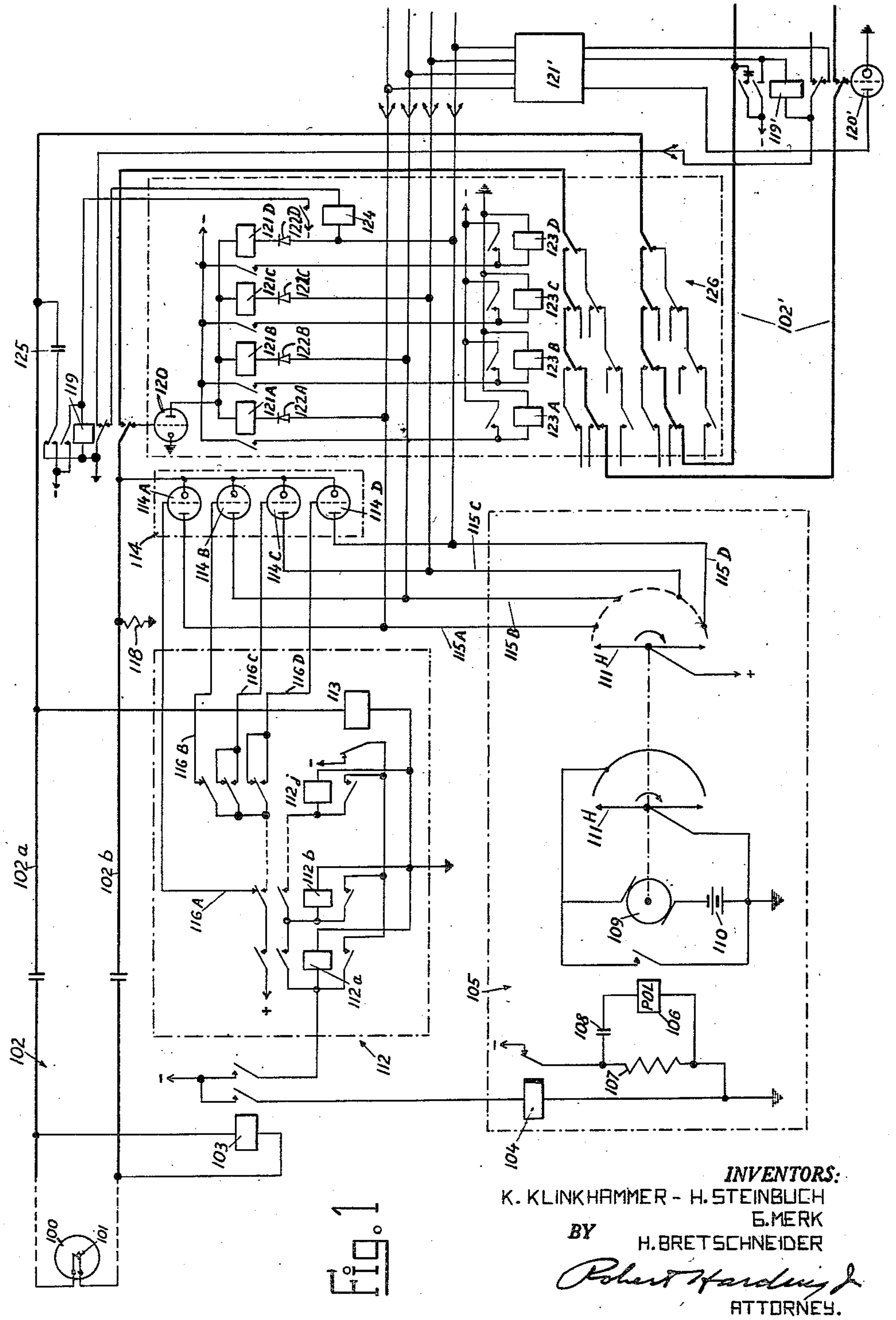

The present invention relates to communication systems and more particularly to automatic telephone systems and the like adapted for the establishment of a connection by means of dial pulses or other digital signals.

It is customary in such systems to provide register means for the temporary storing of the digits represented by the dial pulses or the like, thereby reducing the time during which certain auxiliary equipment common to a number of incoming lines is required for the establishment of a given connection. Thus there may be provided a register comprising a plurality of storage circuits, one for each switching stage, adapted to receive the dialed digits and, after causing the selection of an outgoing trunk, to re-emit so many digital impulse series as are required for the further extension of the connection; this out-pulsing may start either after the last dial pulses are received or at a time when the register is still receiving the last digital pulse trains. With such an arrangement the routing of the call proceeds wholly or substantially independently of the calling subscriber's dialing speed. In another known arrangement there are provided individual registers for each switching stage which, when set in accordance with the respective digital pulse trains, control the establishment of a connection to the next stage. In the latter case the hunting for an available inter-stage link can only take place after each impulse series has terminated, hence the dialing speed of the calling subscriber will determine the total time required for the switching operations.

It will thus be seen that with either of the above systems a separate set of storage elements is required for each digit; since these registers are cumbersome and expensive, it is an object of the present invention to provide a switching system utilizing but a single digital register for all digits, in combination with means for immediately translating each register setting into a switching operation and thereupon releasing the register for the reception of the next digit.

Inasmuch as in accordance with this invention the setting of switches under the control of the single register is carried out in the interval between dial pulse trains, and since part of this interval must be reserved (in the usual case) for the hunting for a free link or path to extend the connection, there remains only a relatively short period of time during which the switching operations can proceed. It is, accordingly, another object of this invention to provide means for correctly transferring the register setting to the corresponding switch or switches within such relatively short period. According to this feature of the invention there is provided, in association with the register, a coding circuit adapted to translate the decimal values expressed by the register into a "shorthand" code of signal combinations transmittable in a fraction of the time that would be required for the transmission of up to ten digital impulses. Such "shorthand" codes include a binary code in which four signal elements, adapted to express sixteen different combinations, are selectively actuated to indicate the digits from one through zero; another such code is a two-out-of-five code affording ten different combinations of two signal elements each, with the attendant advantage that the invariable number of actuated elements enables ready verification of correct operation.

Other objects of this invention include the provision of means for placing the release of the register under the control of a supervisory signal from the operated switches, and the utilization of pre-existing transmission means, such as one or more of the talking conductors of a telephone line, for the transmission of such supervisory signal and/or of the forward switching signals from the register.

The above and other objects and features of the invention will become more fully apparent from the following description, reference being had to the accompanying drawing in which Figs. 1, 2, 3 and 4 are four circuit diagrams of telephone central-office equipment representing different embodiments of a register and switching system according to the invention.

In Fig. 1 there is indicated at 100 a subscriber station of the details of which only the dial contacts 101 have been shown. A line 120, comprising tip conductor **102*a* and ring conductor 102*b*, extends from the outlying station 100 toward the exchange. Bridged across these conductors at the exchange is a repeating relay 103 which follows the dial pulses and over its inner armature and front contact energizes a relay 104, the latter being of the slow-releasing type so as to hold up between the impulses of a series. Relay 104 forms part of an impulse generator or timer broadly designated 105, here shown to comprise a polarized start relay 106, an energizing circuit for the latter relay including a resistor 107 in series with an armature and back contact of relay 104 and a condenser 108 bridged across this resistor in series with the winding of relay 106, a motor 109 energizable from a source of power 110 over a front contact of the start relay 106, and a two-level rotary switch 111, 111H driven from motor 109. The outer armature of relay 103, over its front contact, connects battery to a register, generally designated 112, in step with the dial pulses. The register 112 is here shown to consist of a chain of ten relays 112*a* . . . 112*j*, of which only the first two relays 112*a*, 112*b* and the last relay 112*j* have been illustrated, and of a release relay 113 over whose back contact battery is normally applied to the front contacts associated with the holding armatures of chain relays 112*a* . . . 112*j*. Relay 113 has its winding connected between ground and the tip conductor 102*a***.

A translating unit 114 comprises four quick-acting electronic relays 114A, 114B, 114C, 114D each represented by a three-element gas-filled tube. These tubes, which together with certain contacts of relays **112*a* . . . 112*j* and of the impulse generator 105 form part of a coding circuit, have their anodes connected over individual leads 115A, 115B, 115C, 115D to respective bank contacts associated with switch arm 111, their grids over individual leads 116A, 116B, 116C, 116D to the register 112, and their cathodes in multiple to talking conductor 102*b*. The leads 116A . . . 116D are so connected to front and back contacts of register relays 112*a* . . . 112*j* that positive potential is applied thereto in different combinations, depending upon the number of energized register relays in the chain. Thus the connections illustrated in Fig. 1 have been so chosen that a single dial impulse, resulting in the operation of relay 112*a* alone, will connect battery to the grid of tube 114A over a front contact of relay 112*a* and a back contact of relay 112*b*; nine impulses, causing the operation of the nine relays preceding relay 112*j*, will connect battery to leads 116B, 116C, 116D over the front contacts of said preceding relays and back contacts of relay 112*j*; and a series of ten impulses, corresponding to the digit "zero" and operating all ten register relays, will apply battery to the grids of tubes 114C, 114D over front contacts of these relays and leads 116C, 116D. Conductor 102B is grounded by way of a resistor 118**.

Positive potential successively applied to the leads 115A . . . 115D and, hence, to the plates of tubes 114A . . . 114D by the switch arm 111 is of such magnitude as to energize each tube only if battery is simultaneously connected to its grid via the respective lead 116A . . . 116D. The single contact strip associated with switch 111H serves as a homing arc and applies off-normal ground to the motor 109 after the relay 106 has released.

The portion of ring conductor **102*b* which is connected to the cathodes of tubes 114A . . . 114D terminates in an armature of a switch-over relay 119 whose back contact is connected to the grid of another gas-filled triode 120. The anode of tube 120, whose cathode is grounded, is connected in parallel to the windings of four code relays 121A, 121B, 121C, 121D and through these windings, by way of isolating rectifiers 122A, 122B, 122C, 122D, to the leads 115A . . . 115D, respectively. Each of these relays 121A . . . 121D has a respective companion relay 123A, 123B, 123C, 123D which locks when the corresponding coding relay is energized. There is, in addition, connected between lead 115D and ground on a back contact of relay 119 a supervisory relay 124 which when operated energizes, over its armature and front contact, the relay 119; an armature of the latter relay, connected via condenser 125 to tip conductor 102*a***; has a grounded back contact and a front contact connected to negative battery.

From another front contact of relay 119 an extension of conductor **102*b* leads toward a first set of armatures controlled by relays 123A . . . 123D while conductor 102*a* is extended toward a second set of such armatures. The contacts of these relays, which together with the relays 121A . . . 121D, tube 120 and relay 124 form part of a selector switch 126, are so arranged that operation of the coding relays 121A . . . 121D and 123A . . . 123D in any one of ten different combinations will extend the line 102 over a respective one of ten different paths, one of these paths being a line 102′ which leads to a subsequent switching stage comprising a gas-filled tube 120′ similar to tube 120, a switch-over relay 119′ similar to relay 119 and having its winding connected to ground on a front contact of the latter, and a set of coding relays diagrammatically indicated at 121′ and connected, in analogy with relays 121A . . . 121D, between the plate lead of tube 120′ and extensions of leads 115A . . . 115D. The coding relays 121′, as will be readily understood, control switching relays similar to relays 123A . . . 123D for the purpose of further extending the line 102′** to yet another switching stage, an outgoing trunk, a called line or the like.

For a description of the operation of the system of Fig. 1 let it be assumed that the subscriber at station 100 has dialed the digit "0," thereby transmitting a series of ten impulses over the line 102 to energize the repeating relay 103 a corresponding number of times. Relay 104 operates at the beginning of the series and holds up between impulses, thereby removing battery from the left-hand terminal of condenser 108 and allowing the latter to discharge through resistor 107 without, however, operating the polarized relay 106. Relay 103 upon first attracting its outer armature energizes relay **112*a* which locks over its lower armature and over its inner upper armature prepares an operating circuit for relay 112*b*, but the short duration of the dial pulse prevents the latter relay from operating before the release of relay 103. Upon the second operation of relay 103, however, relay 112*b* attracts it armatures and in like manner prepares the operation of the next relay in the series, whereby all ten relays up to and including relay 112*j* will be actuated and locked at the termination of the pulse train. This operation places positive battery upon the leads 116C, 116D and, thereby, upon the grids of the corresponding triodes 114C, 114D** which latter, however, do not become ionized at this time because their plates are not yet connected to potential.

When impulsing has stopped, relay 104 releases and recloses the charging circuit for condenser 108 so as to send a current pulse through the winding of starting relay 106. This relay operates momentarily and closes the circuit for motor 109 which sets in motion the switch arms or wipers 111, 111H. Wiper 111H closes the homing circuit for motor 109 which is thus maintained energized independently of relay 106. Wiper 111 successively connects the leads 115A . . . 115D to positive battery, so that tubes 114C and 114D are momentarily ionized when this wiper engages its third and its fourth bank contact, respectively. Energization of tube 114C produces a voltage drop across resistor 118 which drives positive the grid of tube 120, this action enabling a brief energization of coding relay 121C from battery over lead 115C, rectifier 122C, winding of relay 121C, anode-cathode gap of tube 120 to ground. Relay 121C operates relay 123C which locks over its upper armature and front contact. In analogous manner the relay 121D operates under the control of tube 114D and causes relay 123D to lock operated over its upper armature and front contact.

Relay 124, operating simultaneously with relay 121D in its previously traced circuit extending to potential on the fourth bank contact of wiper 111, energizes relay 119 which at its lowermost armature extends the conductor **102*b* to the lower armature of operated relay 123D and at its uppermost armature applies negative battery instead of ground to the left-hand terminal of condenser 125, thereby sending a charging current through the winding of release relay 113. This relay operates momentarily, thereby opening the locking circuit of register relays 112*a* . . . 112*j* which release. The digit previously stored in register 112 is now obliterated. Relays 123C and 123D, by their operation in response to the dialing of the digit "zero," have in the meantime connected line 102 to the line 102′, extending the connection to the switching stage 119′, 120′, 121′ which now stands ready to be controlled by the register 112 as soon as the next dial pulse train is received, motor 109 having come to rest upon the switch arm 111H** stepping off its homing arc.

Figure 2:
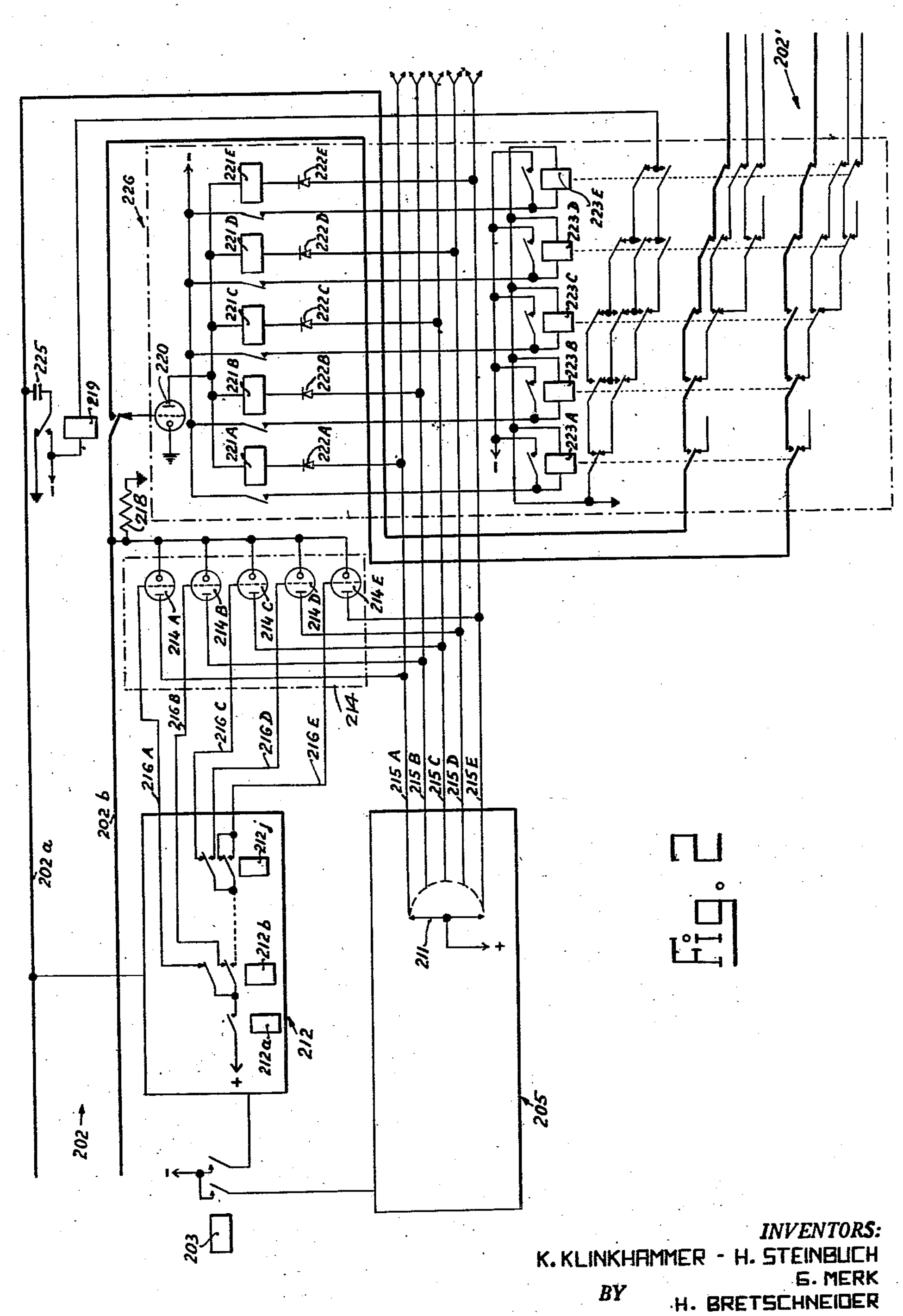
Figure 3:
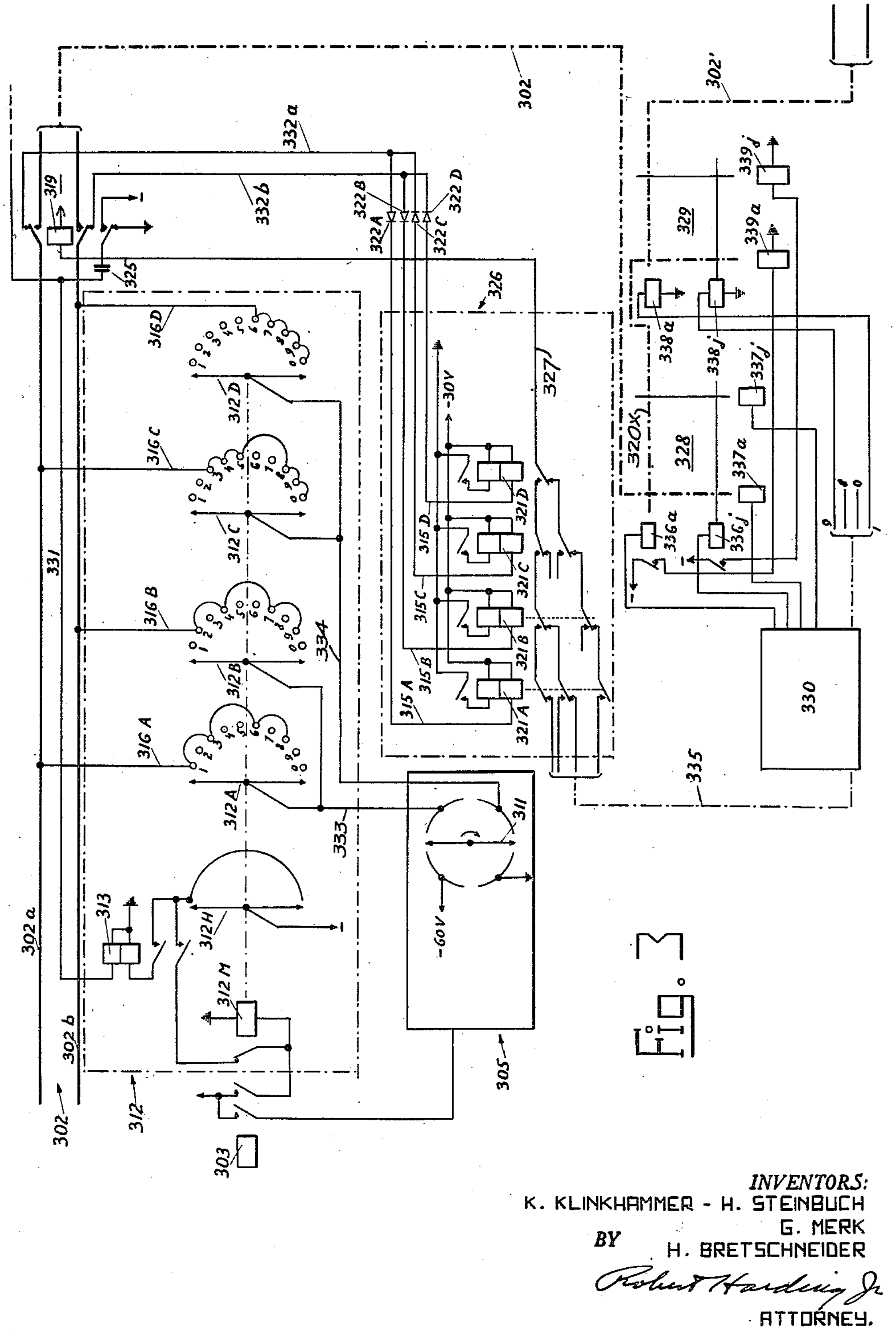
Figure 4:
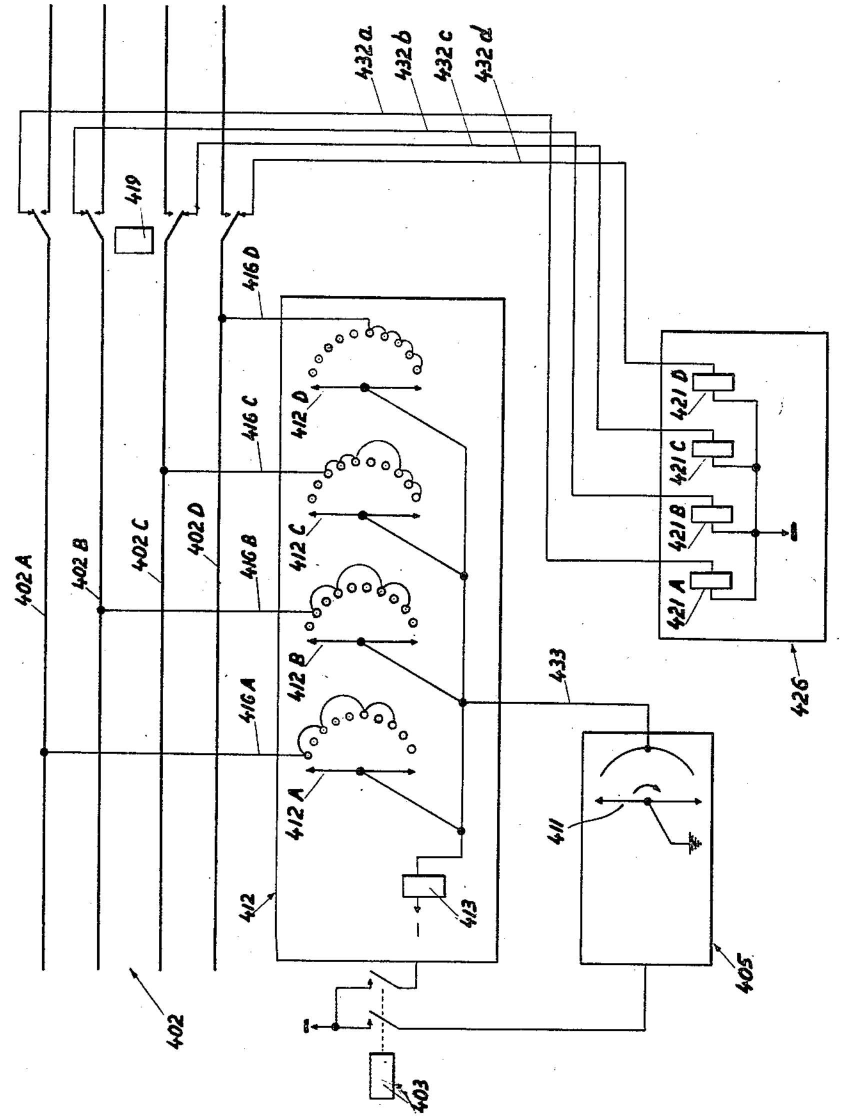

Elements of Figs. 2, 3 and 4 having counterparts in Fig. 1 have been designated by similar reference numerals, except that the "1" in the hundreds position has been replaced by a "2," "3" or "4," respectively.

The system of Fig. 2 comprises a line 202 including conductors **202*a* and 202*b*, a register 212 controlled from an armature of repeating relay 203 and also controlled from switch-over relay 219 through condenser 225 and tip conductor 202*a*, said register including a chain of ten relays 212*a*, 212*b* . . . 212*j*, a translating unit 214, a selector switch 226, and an impulse generator or timer 205 likewise controlled from an armature of relay 203. The translator 214 contains five gas-filled triodes 214A, 214B, 214C, 214D, 214E, each having its cathode connected to ring conductor 202*b*, grounded via resistor 218, its grid connected to a respective conductor 216A . . . 216E extending toward the register 212, and its anode connected to a respective lead 215A . . . 215E leading to a respective bank contact associated with switch arm 211 of generator 205. Selector switch 226 comprises five coding relays 221A . . . 221E, each with a respective companion relay 223A . . . 223E, which coding relays are connected by way of respective rectifiers 222A . . . 222E between the anode of gas-filled triode 220 and respective ones of the leads 215A . . . 215E. The grid of tube 220, whose cathode is grounded, is normally connected to ring conductor 202*b* by way of the lower armature of relay 219**.

The connections from the register 212 and the generator 205 via the leads 215A . . . 215E and 216A . . . 216E to the five translating tubes 214A . . . 214E and the five coding relays 221A . . . 221E are so chosen that the same number of tubes and relays, i. e. two, will be energized in response to the dialing of any digit from one through zero. Thus, operation of register relay 212*a* in response to a single dial pulse will cause ionization of tubes 214A, 214B, momentary operation of coding relays 221A, 221B (in the first and the second position, respectively, of switch arm 211) and locking of switching relays 223A, 223B, thereby establishing a connection between incoming line 202 and an outgoing line 202' extending to a subsequent stage (not shown). Similarly, operation of the nine register relays preceding relay 212*j* will energize tubes 214C, 214E and relays 221C, 221E and 223C, 223E, whereas operation of all ten register relays 212*a* . . . 212*j* will energize tubes 214D, 214E and relays 221D, 221E and 223D, 223E.

It will be noted that relays 223A . . . 223E, in contradistinction to relays 123A . . . 123D of Fig. 1, are provided with an additional set of armatures forming a two-out-of-five check circuit over which ground is connected to a lead 227, and, thence, to the winding of relay 219, whenever not more and not less than two of these switching relays are operated. Closure of this check circuit thus energizes relay 219 which attracts its lower armature, thereby disconnecting the conductor 202*b* from the grid of tube 220 and extending said conductor to the lowermost armature of relay 223A, and in attracting its upper armature transmits a supervisory signal to register 212 by causing the flow of a charging current through a condenser 225 as previously described for condenser 125. The register 212 is thereby released and conditioned to receive the next train of dial pulses, to be used for controlling the next switching stage to which the line 202 has been extended.

It is to be understood that conventional means for hunting among a number of outgoing lines may be provided in combination with a selector switch such as 126 or 226 in Fig. 1 or 2. This has been illustrated in Fig. 3 which shows a line 302 comprising conductors 302*a*, 302*b*, a register 312 and an impulse generator or timer 305 both controlled from a repeating relay 303, a selector switch 326, and a primary cross-bar switch 328, a secondary cross-bar switch 329, and a link control circuit 330 adapted to hunt for a free line link between these two cross-bar switches under the control of the selector switch 326. The register 313 is here shown, by way of example, to comprise a five-bank stepping switch including stepping magnet 312M and wipers 312A, 312B, 312C, 312D, 312H, in addition to a restoring relay 313 having an operating winding and a holding winding; the operating winding of this relay is connected between ground and negative battery in series with a condenser 325 and an armature and front contact of switch-over relay 319 by way of a special conductor 331.

The selector switch 326 comprises four coding relays 321A . . . 321D which are similar to the relays 121A . . . 121D of Fig. 1 but are each provided with a second, or holding, winding in addition to their operating windings, thereby dispensing with the need for separate switching relays such as 123A . . . 123D. The energizing circuit for each of these coding relays extends from a common battery terminal of —30 volts through the winding of the respective coding relay, a respective lead 315A . . . 315D and a respective rectifier 322A . . . 322D to one of two conductors 332*a*, 332*b*, thence over a back contact and armature of relay 319, tip conductor 302*a* or ring conductor 302*b* and a respective lead 316A . . . 316D to selected bank contacts engageable by the corresponding wiper 312A . . . 312D of register 312.

Switch arm 311 of generator 305 has two off-normal or operating positions in which impulses are transmitted toward the selector 326 over talking conductors 302*a*, 302*b*. In its first operating position this switch arm connects ground to the wipers 312A and 312B by way of a lead 333; in its second operating position it connects negative battery of —60 volts to the wipers 312C and 312D by way of a lead 334. Rectifiers 322A and 322B are so poled as to pass only the positive pulse applied to tip conductor 302*a* or to ring conductor 302*b*, in the first operating position of arm 311*b*, via lead 316A or 316B, respectively; rectifiers 322C and 322D, on the other hand, are so poled as to pass only the negative pulse applied to these conductors, in the second operating position of arm 311*b*, via lead 316C or 316D, respectively.

The connection between the leads 316A . . . 316D and the bank contacts of stepping-switch arms 312A . . . 312D are such that a pulse will be applied to one or more of these leads, by the generator 305, in ten different combinations depending upon the position of the stepping switch. With the generator 305 emitting its first, positive pulse over lead 333 and its second, negative pulse over lead 334, only the relay 321A, connected to tip conductor 302*a* via rectifier 322A, and the relay 321B, connected to the ring conductor 302*a* via rectifier 322B, can operate in response to this pulse whereas only the relay 321C, connected to tip conductor 302*a* via rectifier 322C, and relay 321D, connected to ring coinductor 302*b* via rectifier 322D, can operate in response to said second pulse. It will be seen that in position 1 of the stepping switch ground is connected only to lead 316A and, thence, to conductor 302*a*, resulting in the sole operation of relay 321A; in position 9 ground is applied to lead 316B, thus also to conductor 302*a*, whereas —60 v. potential is subsequently applied to leads 316C and 316D, thus to both conductors 302*a* and 302*b*, whereby first the relay 321B and then the relays 321C and 321D will be energized. In analogous manner the energization of relays 321C and 321D will occur in the tenth position of the stepping switch, representing the digit "0."

It will thus be noted that with the arrangement of Fig. 3 the need for extending four conductors such as 115A . . . 115D through all switching stages has been avoided, use being made instead of the two talking conductors each of which carries two pulses distinguished (in the case illustrated) by their polarity. It would, of course, also be possible to use only a single conductor for the transmission of four appropriately distinguished coding pulses. It can be seen, accordingly, that with a binary coding system the product of number of pulses and number of leads must be four if ten different digital values (or, in fact, up to sixteen such values) are to be transmitted.

The lower armatures of coding relays 321A . . . 321D have been arranged in much the same manner as those of switching relays 123A . . . 123D of Fig. 1. The outgoing leads from these armatures, shown combined in a bracket 335, extend to the link control circuit 330 through the intermediary of which switching means associated with the cross-bar switches 328 and 329 are selectively operated. These switching means have been represented in Fig. 3 by select magnets 336*a*, 336*j* and hold magnets 337*a*, 337*j* associated with switch 328 as well as select magnets 338*a*, 338*j* and hold magnets 339*a*, 339*j* associated with switch 329.

The link control circuit 330 serves in the known manner to select one of several incoming lines, such as line 302, competing for the services of cross-bar switches 328 and 329. This is accomplished by preferentially energizing one of the primary hold magnets, such as 337*a* or 337*j*, in response to potential on a conductor of one of the incoming lines, such as may be applied by selector switch 326 to one of the leads within bracket 335 associated with line 302. The identity of the lead so marked determines which of the secondary select magnets, such as 338*a* or 338*j*, is to be energized; circuit 330 thereupon chooses an available link between switches 328, 329 by preferentially energizing a free primary select magnet, such as 336*a* or 336*j*, which completes the connection by operating the proper secondary hold magnet, such as 339*a* or 339*j*.

For an understanding of the operation of the system of Fig. 3 let it be assumed that the subscriber has dialed the digit "1," that this selection is designed to extend the call by connecting the line 302, which terminates in the first vertical of switch 328, to a line 302' terminating in the first horizontal of switch 329, and that a link 302X between these two lines is idle. Link 302X, it will be noted, is controlled by the select magnet **336*a* and the hold magnet 339*a*, the latter being operable over a front contact and armature of the former. When the wipers 312A . . . 312D of register 312 have been stepped by the single dial pulse (which momentarily energizes magnet 312M) to their first operating position, relay 321A is energized from ground over switch arm 311, lead 333, wiper 312A, lead 316, tip conductor 302*a*, upper armature and back contact of switch-over relay 319, lead 332*a*, rectifier 322A, lower winding of relay 321A to —30 v. negative battery. Relay 321A locks over its upper winding and attracts its lowermost armature, thereby connecting lead 327 with the lead marked "1" within bracket 335. The latter lead, it will be noted, terminates at select magnet 338*a* associated with the outgoing line 302'. A circuit is thus closed from ground through the windings of magnet 338*a* and relay 319 in series to negative battery. Select magnet 336*a* and hold magnet 337*a*, preferentially energized under the control of circuit 330, as well as hold magnet 339*a* controlled by select magnet 336*a* operate along with select magnet 338*a* to establish the connection 302, 302X, 302'. Relay 319, meanwhile, has attracted its armatures to disconnect conductors 302*a*, 302*b* from the leads 332*a*, 332*b* and to extend them toward the primary cross-bar switch 328; at the same time this relay, in changing the potential of the right-hand terminal of condenser 325, sends a current pulse over lead 331 which energizes the upper winding of restoring relay 313, the latter locking from ground via its lower winding, inner lower armature and front contact, homing strip of wiper 312 and said wiper to negative battery. This wiper now applies battery from its homing strip over the outer lower armature of relay 313 to magnet 312M, by way of the latter's own interrupter contacts, thus causing the register switch to be stepped to its normal position in which the relay 313 releases. It may be mentioned that the lead 331 associated with supervisory relay 319** extends to similar relays, not shown, in subsequent switching stages.

Fig. 4 illustrates an arrangement generally similar to that of Fig. 3, except that use is made of a single coding impulse transmitted over four talking conductors **402*a*, 402*b*, 402*c*, 402*d*. These conductors, which may be assumed to be pre-existing members of a toll line 402, are normally connected over respective armatures and back contacts of a switch-over relay 419 to respective leads 432*a*, 432*b*, 432*c*, 432*d*. Each of the latter leads extends to the winding of a respective coding relay 421A . . . 421D in selector switch 426. Repeating relay 403 controls register 412, which comprises a stepping switch having wipers 412A . . . 412D, and impulse generator or timer 405 which includes switch arm 411. Arm 411 has a single bank contact over which it applies ground to a lead 433 connected to the wipers 412A . . . 412D. Selected bank contacts engageable by these wipers, arranged in combinations identical with those shown in Fig. 3, are connected to leads 416A . . . 416D each tied to a respective one of the conductors 402*a* . . . 402*d***. The remaining connections, which are the equivalent of circuits fully illustrated in the preceding figures, have not been shown.

The availability of four conductors 402A . . . 402D dispenses with the need for rectifiers and enables the operation of the coding relays in selected combinations by means of a single coding impulse from generator 405. The same impulse, it may be mentioned, can be utilized for restoring the register 412 in the absence of any other check-back signal from the selector switch, as by actuating a slow-operating homing relay 413 corresponding to relay 313 of Fig. 3.

It should be understood that compatible features shown in the various figures of the drawing may be combined and that the embodiments illustrated may be otherwise modified or adapted to different circumstances without thereby departing from the scope of the invention as defined in the appended claims.

What is claimed is:

1. In a communication system, in combination, an incoming line, a single register connected to said line and adapted to successively store single digits represented by digital signals received over said line, a plurality of outgoing lines, first switch means for selectively connecting said incoming line to any one of said outgoing lines under the control of a first digit stored by said register, first actuating means for said first switch means responsive to completion of the storing of said first digit by said register, second switch means for further extending a selected one of said outgoing lines in response to the receipt by said register of a second digit, second actuating means for said second switch means, switch-over means normally connecting said first actuating means and said first switch means to said register and adapted to operate subsequent to operation of said first switch means for disconnecting said first actuating means and said first switch means from said register and connecting said register to said second actuating means and said second switch means, thereby preparing operation of said second switch means in response to said second digit stored by said register, and register-restoring means under control of and operating substantially simultaneously with said switch-over means to obliterate each digit stored in said register.

2. The combination according to claim 1, comprising a conductor connecting said register initially to said first actuating means and subsequently to said second actuating means, said conductor forming part of said incoming line.

3. The combination according to claim 2 wherein said incoming line is a telephone line and said conductor is a talking conductor of said telephone line.

4. The combination according to claim 1, including supervisory circuit means responsive to proper operation of said switch means to actuate said switch-over means and said register-restoring means.

5. The combination according to claim 4, including a conductor connecting said supervisory circuit means to said register-restoring means, said conductor forming part of said incoming line.

6. The combination according to claim 1, including signal-receiving means connected to said incoming line and controlling said register, and timer means controlled by said signal-receiving means for operating a respective one of said actuating means a predetermined time after reception of said digital signals.

7. The combination according to claim 6 wherein said switch-over means and said register-restoring means are controlled by said timer means.

8. The combination according to claim 1 wherein said first and second switch means each includes translating means comprising a number of storage elements less than the number of different digital values adapted to be stored by said register, said storage elements being operable in different combinations to store each digit in abbreviated code form.

9. The combination according to claim 8 wherein said register is adapted to store ten different digital values and said storage elements are four in number and are operable according to a binary code.

10. The combination according to claim 8 wherein said register is adapted to store ten different digital values and said storage elements are five in number and are operable according to a two-out-of-five code.

11. In a communication system, in combination, an incoming line adapted for the transmission of digital impulses, receiving means responsive to said impulses, a single register controlled by said receiving means and adapted to store up to ten of said impulses at a time, a plurality of outgoing lines, switch means for selectively connecting said incoming line to any one of said outgoing lines under the control of said register, and actuating means for said switch means responsive to completion of the storing of a train of digital impulses by said register, said switch means including translating means comprising not more than five storage elements operable in different combinations to successively store each digit in abbreviated code form, said switch means further including contacts controlled by said storage elements to connect said incoming line to a selected one of said outgoing lines.

12. The combination according to claim 11, comprising a set of conductors connecting said storage elements to said register, said conductors including at least one conductor forming part of said incoming line.

13. The combination according to claim 11 wherein said actuating means includes timer means responsive to said receiving means, said timer means applying at least one impulse to at least one of said storage elements following completion of the storing of said train of digital impulses.

14. The combination according to claim 13 wherein said actuating means further includes a set of electronic relays selectively operable under the joint control of said register and said timer means, each of said electronic relays controlling a respective one of said storage elements.

15. The combination according to claim 11 wherein the number of said storage elements is five, said storage elements being connected to said register for operation in ten different combinations of two in response to respective digital values stored by said register.

16. The combination according to claim 15, including a check circuit and register-restoring means controlled by said check circuit for obliterating a digit stored by said register in response to the operation of not more and not less than two of said storage elements.

17. The combination according to claim 11, including a conductor forming part of said incoming line and relay means normally connecting said conductor in a circuit for operating said storage elements, said relay means being operable a predetermined period following reception of said digital impulses to disconnect said conductor from said operating circuit.

18. In a communication system, in combination, an incoming line adapted for the transmission of digital impulses, receiving means responsive to said impulses, a register controlled by said receiving means and adapted to store up to ten of said impulses at a time, a plurality of outgoing lines, switch means for selectively connecting said incoming line to any one of said outgoing lines under the control of said register, said switch means including translating means comprising not more than five storage elements operable in different combinations to store each digit in abbreviated code form, said switch means further including contacts controlled by said storage elements to connect said incoming line to a selected one of said outgoing lines, and timer means adapted to generate a number of coding pulses not exceeding the number of said storage elements, said timer means being controlled by said receiving means to operate following reception of a train of said digital impulses and exercising joint control with said register over said storage elements.

19. The combination according to claim 18, comprising conductor means connecting said timer means to said storage elements for the transmission of said coding pulses thereover, said conductor means including at least one conductor forming part of said incoming line.

20. The combination according to claim 18 wherein said conductor means consist of a number of conductors representing a fraction of the number of said storage element, said timer means being adapted to emit a number of coding pulses such that the product of the number of said coding pulses and the number of said conductors equals the number of said storage elements.

21. The combination according to claim 20 wherein said timer means comprises an impulse generator adapted to emit successive voltage pulses of different polarities.

References Cited in the file of this patent

UNITED STATES PATENTS

| | | |
|---|---|---|
| 2,423,085 | Den Hertog et al. | July 1, 1947 |
| 2,562,123 | Powell | July 24, 1951 |
| 2,580,095 | Holden | Dec. 25, 1951 |
| 2,585,130 | Jones | Feb. 12, 1952 |
| 2,613,278 | Stehlik | Oct. 7, 1952 |
| 2,638,506 | Bray et al. | May 12, 1953 |

FOREIGN PATENTS

| | | |
|---|---|---|
| 621,816 | Great Britain | Apr. 20, 1949 |
| 487,619 | Canada | Oct. 28, 1952 |